United States Patent [19]

Teshima et al.

[11] Patent Number: 4,654,533
[45] Date of Patent: Mar. 31, 1987

[54] METHOD FOR READING OUT A RADIOGRAPHIC IMAGE

[75] Inventors: Manami Teshima; Hisanori Tsuchino; Hiroshi Takeuchi; Fumio Shimada, all of Hino, Japan

[73] Assignee: Konishiroku Photo Industry Co., Ltd., Tokyo, Japan

[21] Appl. No.: 541,983

[22] Filed: Oct. 14, 1983

[30] Foreign Application Priority Data

Oct. 20, 1982 [JP] Japan .............................. 57-185086

[51] Int. Cl.[4] .............................................. G01T 1/105
[52] U.S. Cl. .............................. 250/484.1; 250/327.2
[58] Field of Search ............... 250/459.1, 458.1, 327.2, 250/484.1

[56] References Cited

U.S. PATENT DOCUMENTS

| | | | |
|---|---|---|---|
| 3,859,527 | 1/1975 | Luckey | 250/327.2 |
| 4,125,842 | 11/1978 | Ohnishi et al. | 346/1.1 |
| 4,258,264 | 3/1981 | Kotera et al. | 250/484.1 |
| 4,336,154 | 6/1982 | Nishimura et al. | 252/301.4 H |
| 4,415,794 | 11/1983 | Delfino et al. | 219/121 LM |
| 4,498,006 | 2/1985 | Horikawa et al. | 250/327.2 |
| 4,543,479 | 9/1985 | Kato | 250/327.2 |

Primary Examiner—Janice A. Howell
Assistant Examiner—Constantine Hannaher
Attorney, Agent, or Firm—Jordan B. Bierman

[57] ABSTRACT

A method for reading out a radiographic image by detecting the stimulated emission having an extremely high intensity. This high intensity is obtained by the choice of the $Ar^+$ laser beam as a stimulating ray.

5 Claims, 9 Drawing Figures

METHOD FOR READING OUT A RADIOGRAPHIC IMAGE

BACKGROUND OF THE INVENTION

1. Field of the Invention

This invention relates to a readout in a radiographic image system. More particularly, it relates to a readout in those radiographic image systems where a radiographic image is recorded on a stimulable phosphor (hereinafter simply called a "phosphor") firstly, then read out, reproduced and at last recorded on a recording-medium as a final image.

2. State of the Art

Up to now, to obtain radiographic images, so-called radiography has been employed which utilizes silver halides. However, recently, for fear of running out of silver resources in the world, it becomes desirable not to use silver halides in picturizing a radiographic image.

A substitute method is developed for the above mentioned radiography where a phosphor accumulating a radiation energy penetrated through an object is stimulated with an energy to emit the stored radiation energy as phosphorescence which is detected and picturized to make an image. As a concrete method, for example, British Pat. No. 1,462,769 and Japanese Patent Publication Open to Public Inspection (hereinafter called "Japanese Patent O.P.I. Publication") No. 29889/1976 propose to convert a radiographic image employing a thermal phosphor as the above-mentioned phosphor, thermal energy as the stimulating energy. This image conversion method employs a panel made by providing a support with thermal phosphor to absorb a radiation through an object thereby accumulates the radiation energy corresponding to the above-mentioned radiation in density, thereafter, by heating the thermal phosphor layer, this accumulated energy is taken out as an optical signal whose amplitude given an image.

Another method for converting a radiographic image is proposed in U.S. Pat. No. 3,859,527 and Japanese Patent O.P.I. Publication No. 12144/1970, which employs an electromagnetic radiation selected from among visible rays and infrared rays as the stimulation energy.

Relating to this method, an improvement of total S/N ratio is proposed in Japanese Patent O.P.I. Publication No. 12429/1970 where a stimulating light having wavelength from 600 to 700 nm is applied and a stimulated emission having 300 to 500 nm wavelength is selectively detected through a photodetector. Because this method requires no heating, the panel in this method is not required to be heat-resistive, and this method is preferable one from this point of view.

However, in this method the stimulating energy is insufficient even when a He-Ne laser is applied, and high-speed scanning on the panel is difficult with the stimulating rays. Moreover, the radiation dose to the object is not sufficiently reduced. On the other hand, because the band gap of the trap which can be stimulated by the rays of 600 to 700 nm wavelength rays is relatively small, a fading phenomenon cannot be ignored and the radiation energy information may be hardly preserved over a long period. Furthermore, with the stimulating rays of this wavelength range, rising time of the stimulated emission fairly lags behind that of the stimulating rays, similarly about the falling time. This makes another factor which retards high-speed scanning on the panel with the stimulating rays.

SUMMARY OF THE INVENTION

It is an object of the invention to solve the above-mentioned problems, to thereby provide a practical method for reading out a radiographic image which enables high-speed scanning with the stimulating rays, corresponding high-speed readout, and less decay of the image recorded in a phosphor.

We, the inventors, found that such object of the invention is achieved in a method for reading out a radiation image pattern recorded in a stimulable phosphor, characterized in that the stimulable phosphor is scanned with an $Ar^+$ laser beam having the wavelength of 514.5 nm as a stimulating ray, and the stimulated emissions of 300 to 500 nm are detected by a photodetector.

DETAILED DESCRIPTION OF THE INVENTION

In this invention, the term, "phosphor", means a stimulable phosphor that emits rays corresponding to the dose of previous irradiation by an optical, thermal, mechanical, chemical, electric or other stimulation, and where irradiation is performed with visible rays, ultraviolet rays and infrared rays, and the term, "radiation", includes X-rays, gamma-rays, beta-rays, alpha-rays and neutron-rays.

Figure 1:
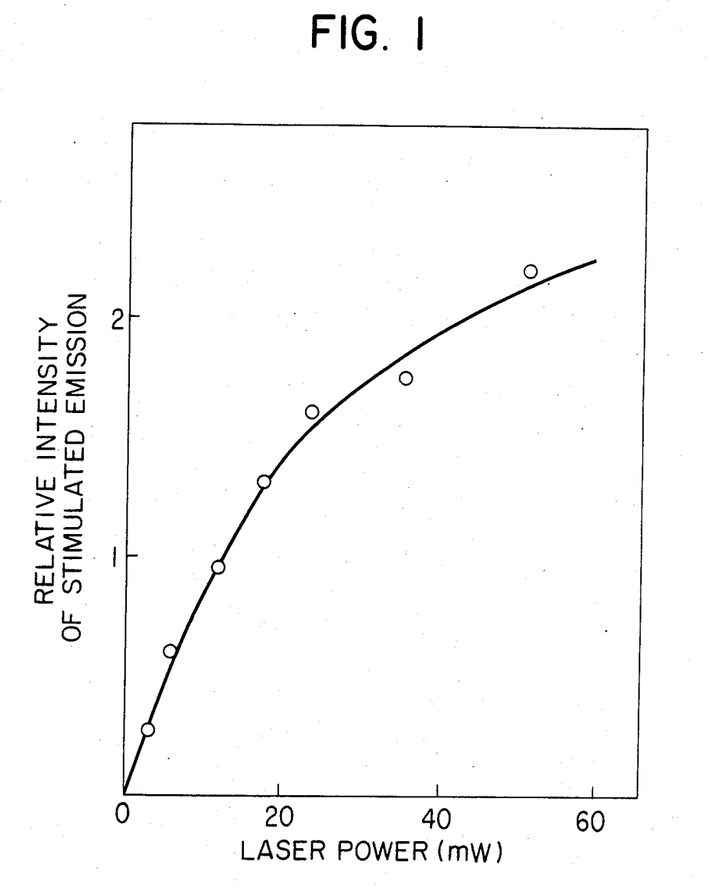
FIG. 1 is a graph indicating a relation between stimulating laser power and intensity of stimulated emission.

One practical purpose of this invention is high-speed reproduction of an actual image from a radiographic image recorded in a phosphor. FIG. 1 shows a typical relation between the power of stimulating rays and the intensity of stimulated emission. Relating to this figure, it can be stated that this relation is approximately proportional. That is, using such a stimulable phosphor, the stronger stimulating laser beam, the more intense emitted rays. For example, when a laser beam of some magnitude requires 10 $\mu$sec to scan one picture element in readout of a radiographic image on the panel, the laser beam of double magnitude enables to scan one picture in 5 $\mu$sec, i.e., doubles the readout speed, thereby the time required to obtain an actual image from a latent image reduces to a half.

An $Ar^+$ laser has about 4 W maximum output power which is fairly large compared to that of a He-Ne laser (about 50 mW). Actually, when we employed an $Ar^+$ laser of 200 mW, for instance, as the stimulating ray source, the intensity of the stimulated emission was about 25 times of that in a case employing a 20 mW He-Ne laser.

Thus, since an Ar+ laser has fairly large maximum power compared to a He-Ne laser, it can produce extremely intense stimulated emission out of the panel. As described above, this enables high-speed scanning on the panel.

Moreover, according to the proportional relation between the stimulating-ray power and the stimulated-emission intensity, we can reduce the radiation dose which affects a human body as the object, by raising the stimulating laser power. This is greatly helpful for preventing radiation diseases in the human body.

On the other hand, where we employ the same panel repeatedly, if the stimulating rays are not intense enough to emit the stored radiation energy as phosphorescence, or if the wavelength of the stimulating rays is improper, the radiation energy may not vanish completely out of the panel and a part of it may remain. This remaining radiation energy affects the subsequent readout of radiographic image as noises, thereby deteriorates quality of the resulting image. Generally, the remaining radiation energy in the panel must be removed by irradiating with rays having similar wavelength to the stimulating rays, previous to the radiation process. However, employing the stimulating rays having large power such as Ar+ laser beam, the radiation energy in the panel can perfectly vanish even if the same panel is used repeatedly, thereby the resulting image keeps fine quality without applying the stimulating rays additionally before the irradiation.

Figure 2:
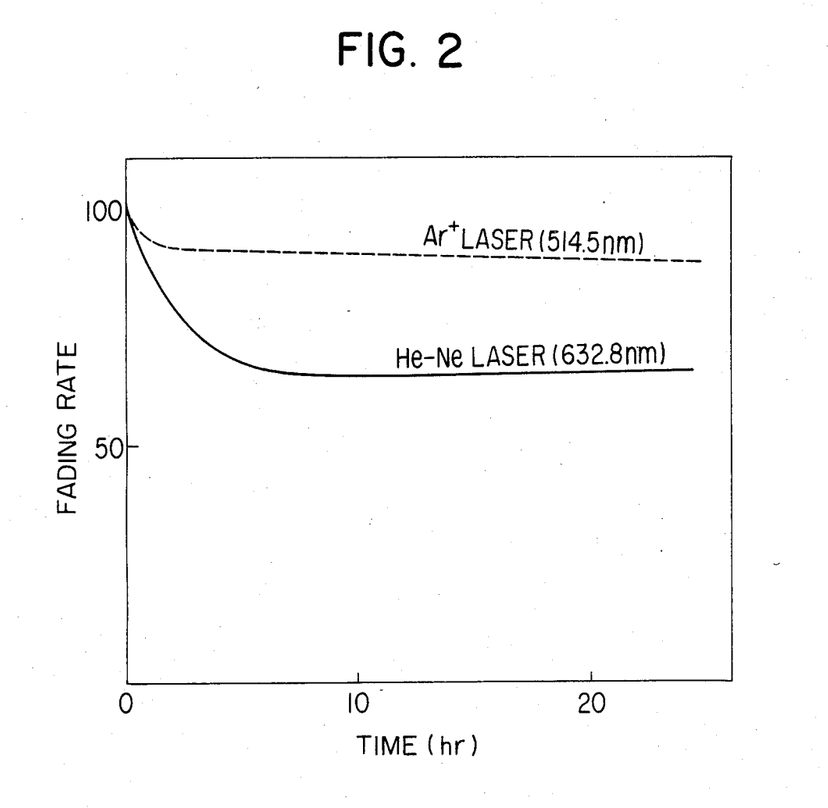
FIG. 2 is a graph indicating fading rates.

FIG. 2 shows that decay of the stored energy in the phosphor depends on the traps a stimulating ray can stimulate. In the concrete, this figure shows relative intensity of the rays emitted from plural panels which are simultaneously irradiated with X-rays and individually stimulated with the rays having specified wavelength after leaving in the dark for each different period, where the criterion of intensity is the value of phosphorescent intensity from the panel stimulated immediately after the described irradiation. Referring to this figure, Ar+ laser beams of 514.5 nm wavelength as a stimulating ray cause less decay of the intensity of stimulated emission than rays of 600 to 800 nm wavelength do. Moreover, with Ar+ laser beams, little decay is shown especially in the region where the interval between the irradiation and the stimulation is more than 2 hours. Accordingly, the use of an Ar+ laser as the stimulating-ray source improves the fading phenomenon thereby a record on the phosphor can be reserved over a long term.

Further, a reduction in this energy decay means that an Ar+ laser beam can stimulate even such a trap as is hardly stimulated by a ray of a relatively longer wavelength such as a He-Ne laser beam, because the Ar+ laser beam is shorter in wavelength and higher in energy level than He-Ne laser beams are. Accordingly, when a stimulation is made by an Ar+ laser beam, the total emission and the sensitivity are increased more and higher, respectively, than it is made by a ray of a relatively longer wavelength such as a He-Ne laser beam. Resultantly, an X-ray dose to a human body can be reduced.

Figure 3:
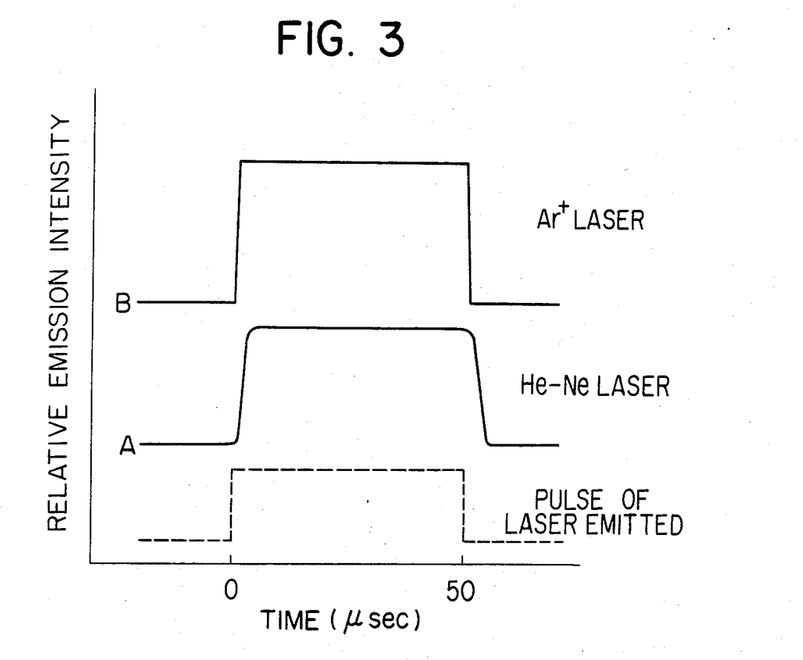
FIG. 3 is a graph indicating the response of a phosphor.

FIG. 3 shows responses of the stimulated emissions where the intensity of the stimulating rays takes a rectangular waveform shown as a dotted line. Curve A in a solid line represents intensity of a stimulated emission stimulated by He-Ne laser beams, while curve B represents that from the same phosphor stimulated by Ar+ laser beams. As this graph indicates, when we applied a He-Ne laser beam pulse of 50 μsec width to the phosphor, the resulting phosphorescence has rise-time and fall-time of about 5 to 6 μsec. However, applying Ar+ laser beams as the stimulating ray, they are reduced to about one μsec., i.e., the improvement of the response is obvious. Thereby, for example, Ar+ laser beams having 100 μsec spot diameter can scan the panel at the scanning rate of not longer than 5 μsec per picture element, which He-Ne laser beams can hardly perform.

On the separation of a stimulated emission from a reflected stimulating ray, we set the wavelength of the stimulated emission and that of the stimulating rays separately, the former to be shorter and the latter to be longer, and, in front of the photodetector, provide a filter which transmits only the stimulated emission, thereby we can prevent a drop of the S/N ratio.

The wavelength of the stimulated emission can be set in the range from 300 to 500 nm by adopting a phosphor whose emission wavelength or emission peak wavelength is in this range. However, because if the photodetector measures rays out of the range, the S/N ratio should extremely drop, it is required to provide a filter which transmits only the rays of this wavelength range, and to use a photodetector which senses rays having wavelength in this 300 to 500 nm range, at least.

Stimulable phosphors to be used in radiographic image conversion panels of the invention are desirably from the practical point of view, phosphors whose stimulated emission occur when irradiated by stimulating rays of 500 nm to 800 nm.

This type of phosphors may be given as the following examples:

Phosphors formularized in $BaSO_4$:Ax in which A represents at least one of Dy, Tb and Tm, and $0.001 \leq x < 1$ mole %, as disclosed in Japanese Patent Publication No. 80487/1973;

Phosphors formularized in $MgSO_4$:Ax in which A represents at least one of HO and Dy and $0.001 \leq x \leq 1$ mole %, as disclosed in Japanese Patent O.P.I. Publication No. 80488/1973;

Phophors formularized in $SrSO_4$:Ax in which A represents at least one of Tm, Tb and Dy and $0.001 \leq x < 1$ mole %, as disclosed in Japanese Patent O.P.I. Publication No. 80489/1973;

Phosphors in which $NaSO_4$, $CaSO_4$, $BaSO_4$ and the like are added with at least one of Mn, Dy and Tb, as disclosed in Japanese Patent O.P.I. Publication No. 29889/1976;

Phosphors comprising BeO, $Li:Mg_2SO_4$, $CaF_2$ and the like, as disclosed in Japanese Patent O.P.I. Publication No. 30487/1977;

Phosphors comprising $Li_2B_4O_7$:CuAg and the like, as disclosed in Japanese Patent O.P.I. Publication No. 39277/1978;

Phosphors formularized in $Li_2O.(B_2O_2)x$:Cu in which x is formularized in $2 < x \leq 3$; and in $Li_2O(B_2O_2)x$:Cu, Ag in which x is formularized in $2 < x \leq 3$; and the like, as disclosed in Japanese Patent O.P.I. Publication No. 47883/1979;

Phosphors formularized in SrS:Ce, Sm, SrS:Eu, Sm, $La_2O_2S$:Eu, Sm, and (Zn, Cd) S:Mn, x in which x represents a halogen, as disclosed in U.S. Pat. No. 3,859,527;

Phosphors comprising ZnS:Cu, $P_6$, as disclosed in Japanese Patent O.P.I. Publication No. 12142/1980;

Barium aluminate phosphors formularized in $BaO.xAl_2O_3$:Eu in which x is formularized in $0.8 \leq x \leq 10$;

Alkaline earth metal silicate phosphors formularized in $M^{II}O.xSiO_2$:A in which $M^{II}$ represents Mg, Ca, Sr, Zn, Cd or Ba; A represents at least one of Ce, Tb, Eu, Tm, Pb, Tl, Bi and Mn; and $0.5 \leq x \leq 2.5$;

Alkaline earth metal fluorohalide phosphors formularized in $(Ba_{1-x-y}Mg_xCa_y)FX:eEu^{2+}$ in which x represents at least one of Br and Cl; x, y, and e respectively satisfy the conditions of the formulas, $0 < x+y \leq 0.6$, $xy \neq 0$ and $10^{-6} \leq e \leq 5 \times 10^{-2}$, as disclosed in Japanese Patent O.P.I. Publication No. 12143/1980;

Phosphors formularized in LnOX:xA in which Ln represents at least one of La, Y, Gd and Lu; X represents Cl and/or Br; A represents Ce and/or Tb; and x represents a numeral formularized in $0 < x < 0.1$, as disclosed in Japanese Patent O.P.I. Publication No. 12144/1980;

Phosphors formularized in $(Ba_{1-x}M^{II}x)$ FX:yA in which $M^{II}$ represents at least one of Ma, Ca, Sr, Zn and Cd; X represents at least one of Cl, Br and I; A represents at least one of Eu, Tb, Ce, Tm, Dy, Pr, Ho, Nd, Yb and Er; x and y represent respectively a numeral satisfying the conditions formularized in $0 \leq x \leq 0.6$ and $0 \leq y \leq 0.2$; as disclosed in Japanese Patent O.P.I. Publication No. 12145/1980;

Phosphors formularized in BaFX:x Ce, yA in which X represents at least one of Cl, Br and I; A represents at least one of In, Tl, Gd, Sm and Zr; and, x and y are formularized in $0 < x \leq 2 \times 10^{-1}$ and, $0 < y \leq 5 \times 10^{-2}$, respectively; as disclosed in Japanese Patent O.P.I. Publication No. 84389/1980;

Rare earth elements activated divalent metal fluorohalide phosphors formularized in $M^{II}FX\ xA:yLn$ in which $M^{II}$ represents at least one of Ba, Ca, Sr, Mg, Zn and Cd; A represents at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln represents at least one of Eu, Tb, Ce, Tm, Dy, Pr, HO, Nd, Yb, Er, Sm and Gd; X represents at least one of Cl, Br and I; x and y are a numeral respectively satisfying the conditions formularized in $5 \times 10^{-5} \leq x \leq 0.5$ and $0 < y \leq 0.2$; as disclosed in Japanese Patent O.P.I. Publication No. 160078/1980;

Phosphors formularized in ZnS:A, CdS:A, (Zn,Cd)S:A, ZnS:A,X and CdS:A,X in which A represents Cu, Ag, Au or Mn; and X is a halogen;

Phosphors formularized in
Formula [I] $xM_2(PO_4)_2 \cdot NX_2:yA$, or
Formula [II] $M_3(PO_4)_2:yA$
in which M and N respectively represent at least one of Mg, Ca, Sr, Ba, Zn and Cd; X represents at least one of F, Cl, Br and I; A represents at least one of Eu, Tb, Ce, ITm, Dy, Pr, He, Nd, Yb, Er, Sb, Tl, Mn and Sn; and, x and y are a numeral satisfying the conditions formularized in $0 < x \leq 6$ and $0 \leq y \leq 1$; as disclosed in Japanese Patent Application No. 148285/1982; and Phosphors formularized in
Formula [III] $nReX_3 \cdot mAX_2':xEu$, or
Formula [IV] $nReX_3 \cdot mAX_2':xEu \cdot ySm$
in which Re represents at least one of La, Gd, Y and Lu; A represents at least one of an alkaline earth metal, Ba, Sr and Ca; X and X' represent at least one of F, Cl and Br, respectively; x and y are a numeral satisfying the conditions formularized in $1 \times 10^{-4} < x < 3 \times 10^{-1}$ and $1 \times 10^{-4} < y < 1 \times 10^{-1}$, respectively; and n/m satisfies $1 \times 10^{-3} < n/m < 7 \times 10^{-1}$.

It is, however, to be understood that phosphors to be used in the invention shall not be limited to the above-mentioned phosphors.

Figure 4:
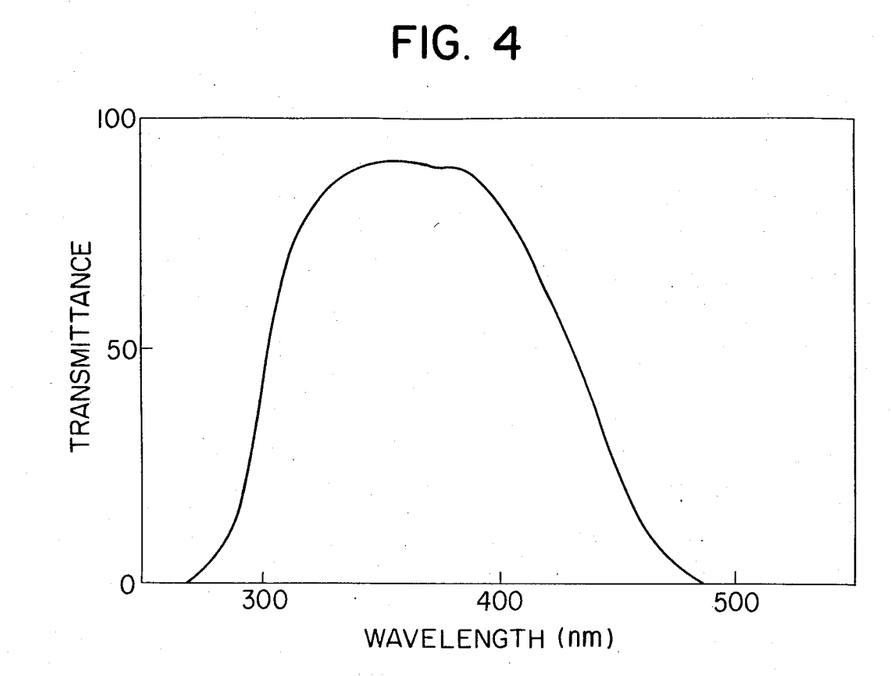
FIG. 4 is a characteristic chart indicating a spectrum distribution of transmittance of a filter for stimulating ray.

FIG. 4 is a spectrum distribution of transmittance of the previously mentioned filter, such as BG-3 (mfd. by Spectrofilm Co.). Because this filter hardly transmits the stimulating ray of 514.5 nm, it can discriminate the stimulated emission from the stimulating ray. Thus, this filter removes the stimulating ray from the stimulated emission not to affect as noises in the readout process, and the S/N ratio remains as high as in the case using the stimulating rays having the wavelength of no shorter than 600 nm.

The invention will now be described in more detail with reference to the accompanying drawings.

Figure 5:
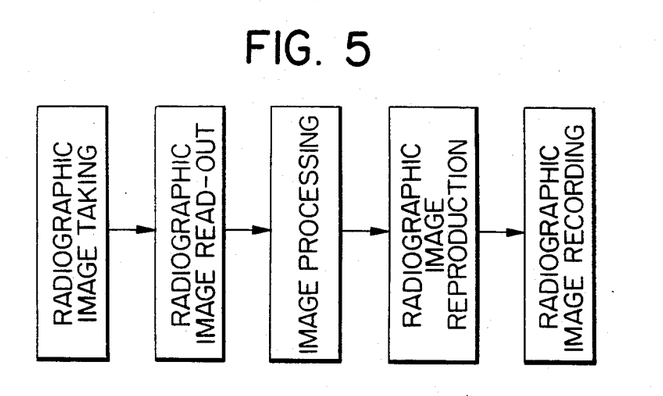
FIG. 5 is a flow chart of a radiographic processing in the invention.

FIG. 5 is a schematic diagram of processes for reproduction recording a radiographic image. X-rays emitted from such a radiation source as an X-ray tube irradiated on a human body, enters a panel to form an image-like pattern of magnitude thereon, thereby the panel stores energy of the radiation (X-rays) to a trap level of the phosphor therein (radiographic image taking).

Then the scanning of the panel is applied with $Ar^+$ laser beam spot having of 514.5 nm to stimulate the stored image-like radiation energy in the trap, thereby stimulated emission of from 300 to 500 nm occurs. This stimulated emission is detected and measured by a photodetector, such as a photoelectron-multiplier tube or a photodiode, which is provide to detect rays of this wavelength range selectively (radiographic image readout).

Subsequently, the output signal of the above-mentioned photodetector is amplified, filtered and level-converted, where the filtering performs noise rejection and cuts off signals beyond the specified bandwidth to obtain the specified resolution. For example, when a 100 μm spot diameter beam scans a panel of $40 \times 40\ cm^2$ in size for about five minutes, amplification bandwidth of this filtering is sufficient to be 50 KHz because the scanning rate is 20 μsec per picture element, then signals beyond this frequency are removed.

Some method can be employed for reducing noise level, such as integrating the output signal for each picture element, or applying the logarithmic transformation to the output signal to contract its amplitude range.

The level conversion is performed on the output signal thus amplified to obtain fine contrast, or to improve sharpness of the picture for observation (image processing).

After processed as above described, the output (electric) signal of the photodetector thus processed is sent to a photoscanning equipment such as a cathode-ray tube, thereby submitted to the observation (radiographic image reproduction). Or, moreover, this reproduced image is recorded on a suitable recording medium (radiographic image recording).

Figure 6:
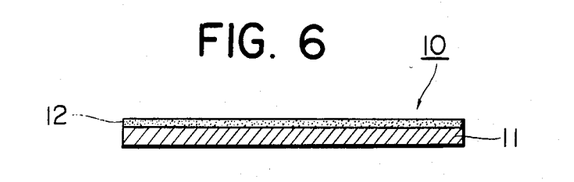
FIG. 6 is a sectional view of a stimulable phosphor panel.

A structure of a panel employed in this invention is exemplified in FIG. 6, wherein the numeral 10 indicates the panel, 11 is a support, 12 is a phosphorlayer laid on the support 11. Panel 10 is usually used in $10'' \times 12''$ or $14'' \times 17''$ in size.

The support can be a sheet of plastics such as polyethylene, a sheet of metals such as aluminium, or a glass plate and the like, whose thickness may determined from a practical point of view. Either transparent or opaque support can freely be used if selecting a suitable position for measuring phosphorescence.

The phosphor to be coated is selected from among the previously mentioned phosphors having stimulated emission of 300–500 nm wavelength, then the selected material is laid in a layer of 50–1000 μm in thickness together with some binder.

Figure 7:
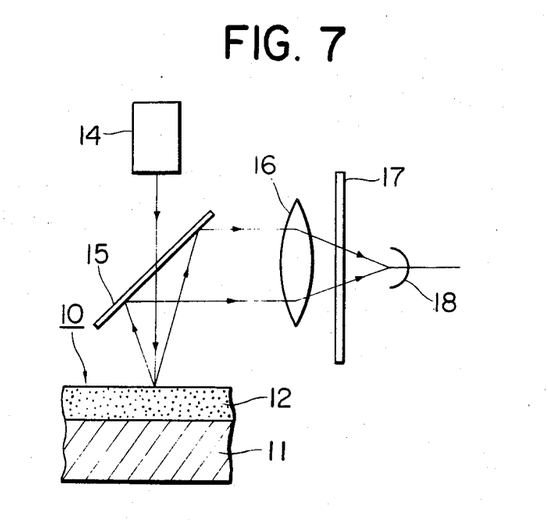
FIG. 7 is a side view of a readout equipment.

FIG. 7 illustrates a radiographic image readout equipment, wherein the stimulating-ray source is an Ar+ laser (514.5 nm).

The stimulating rays of 514.5 nm wavelength emitted from the AR+ laser 14 pass through a half mirror 15 to enter the panel 10. These stimulating rays scan the phosphor layer 12 as a flying spot, where the spot diameter is reasonable to be 50–300 μm because it is difficult for existing technology to narrow the spot diameter down to not larger than 50 μm and because the diameter of not smaller than 300 μm may deteriorate the resolution.

Stimulated by the above mentioned stimulating rays, the phosphor emits the image-like stored radiation energy as the phosphorescence of 300–500 nm wavelength. This phosphorescence is reflected by the half mirror 15, cut off mixed or straying rays having wavelength out of a range 300–500 nm by a filter 17, then enters a photo-detector to be detected and measured.

Because the phosphor layer 12 reflects a part of the stimulating rays which is fairly strong compared to the stimulated emission, it is particularly important to remove this reflection light completely so that the S/N ratio may remain high enough. In this invention, we perform this and prevent these disturbances completely by adopting such a suitable phosphor as described above to separate the wavelength spectrum of the stimulated emission from that of the stimulating rays so as not to overlap, and by employing the filter having the above-mentioned transmittance wavelength range.

As described so far, employing an Ar+ laser of 514.5 nm as the stimulating-ray source brings following effects to this invention:

(1) The readout speed is improved because Ar+ laser beams have large power enough to enables high-speed scanning on the panel.

(2) Radiation dose irradiated can be reduced since Ar+ laser beams have large power.

(3) The fading phenomenon of the energy accumulated in the phosphor is not so serious, thereby the image recorded on the panel can be read out with high stimulated emission intensity for a long term.

(4) Because an Ar+ laser (514.5 nm) emits visible rays, conventional optical elements for visible rays may be used and the adjustment of the equipment is easy.

Making efficient use of the above-mentioned effects, the
  objects of this invention can be completly attained.
  Now an embodiment and a control example will illustrate this invention in the following.

EXAMPLE 1

A panel was made in the manner that 8 parts by weight of a phosphor comprising BaFBr:Eu were dispersed in 1 part by weight of polyvinyl butyral that was a binder by using a solvent prepared by mixing acetone with ethyl acetate both in the same quantity, and the resulting dispersion was coated over to a polyethylene terephthalate substrate by means of a wire-bar. Dry thickness of the phosphor layer of the panel was about 300 μm.

Figure 8:
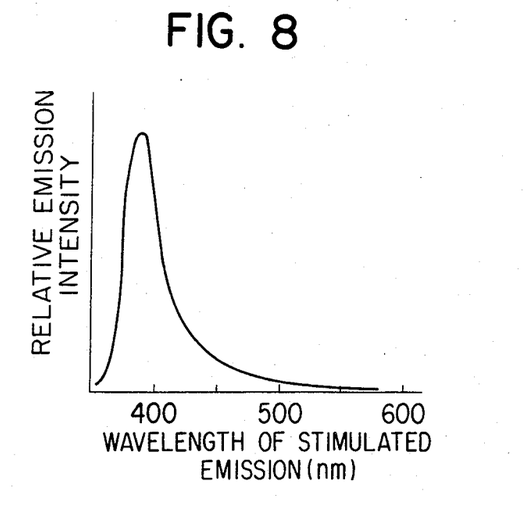
FIG. 8 is a graph indicating the stimulated emission spectrum of BaFBr:Eu.

After irradiating this panel with X rays of 80 KVP tube voltage, we measured the stimulated emission, using the equipment illustrated respectively in FIGS. 5, 6, 7. To perform this, using 10 mW Ar+ laser beams (514.5 nm) as the stimulating rays, the phosphor was stimulated for 4 μsec. FIG. 8 indicates the obtained stimulated emission spectrum and clearly shows that this emission spectrum of the above-mentioned phosphor displayed the peak in the vicinity of 390 nm. Accordingly, the stimulated emission and the stimulating rays were easily separated by using a stimulating-ray cut off filter having a transmittance spectrum of FIG. 4 provided before a photo electron multiplier tube, thereby the stimulated emission was detectable in a high S/N ratio.

Moreover, we obtained a fine image by scanning the above-mentioned panel having 40×40 cm size with the 10 mW Ar+ laser beams in about 20 μsec.

Figure 9:
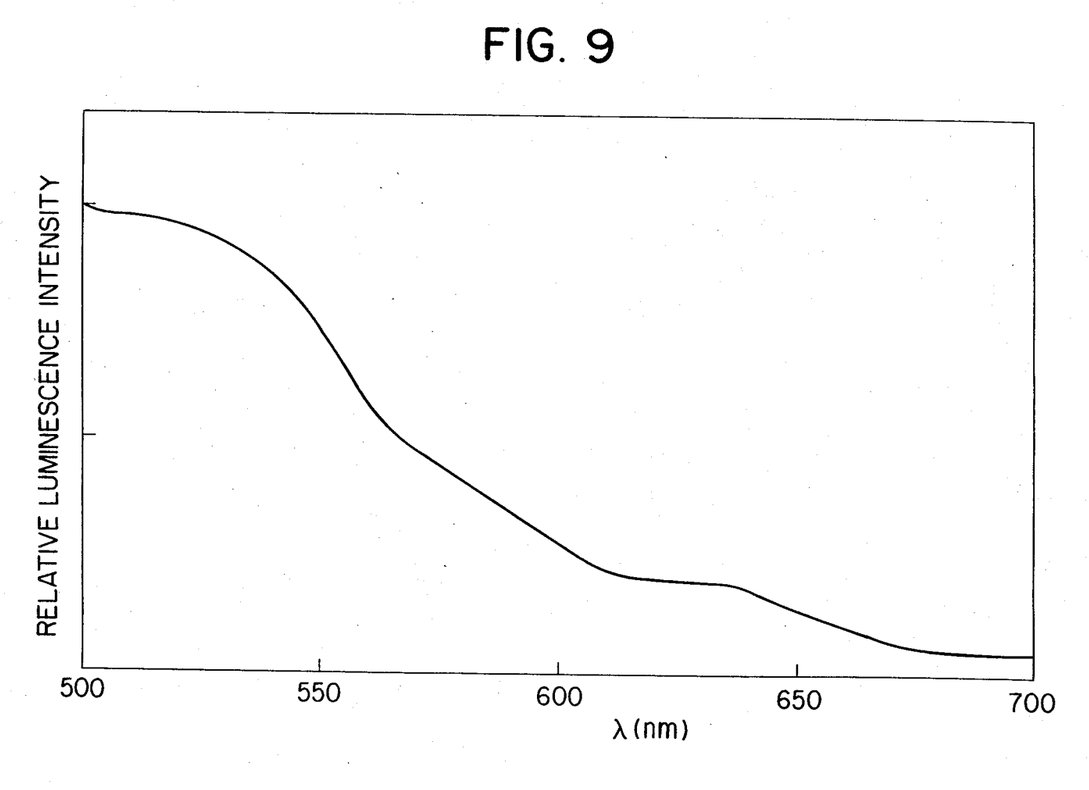
FIG. 9 is a graph indicating the stimulation spectrum of BaFBr:Eu.

Furthermore, FIG. 9 indicates a relation between wavelength of stimulating rays and intensity of stimulated emission, which was measured through applying light energy of various wavelengths after similarly irradiating X rays of 80 KVP tube-voltage to the phosphor. When the phosphor has the peak of its stimulation spectrum in the vicinity of 500 nm, it is particularly effective in the view of the stimulation efficiency to employ Ar+ laser beams of 514.5 nm as the stimulating rays.

CONTROL EXAMPLE 1

After irradiating the same panel as in Example 1 with X rays of 80 KVP tube-voltage, the phosphor was stimulated for 4 μsec with 5 mW He-Ne laser beams (632.8 nm), then measured the stimulated emission providing the previously mentioned filter to cut off the stimulating rays before the photo electron multiplier tube. Then the intensity of the stimulated emission was about 1/5 of that in Example 1.

Moreover, in scanning the above-mentioned panel of 40×40 cm with the 5 mW He-Ne laser beam (632.8 nm), it required about 1 min. to obtain an image having similar quality to that of Example 1.

We claim:

1. A method for reading out a radiation image pattern recorded in a stimulable phosphor comprising the steps of scanning the phosphor with an Ar+ laser beam to generate a detectable emission having a wavelength within the range of 300 to 500 nm, a period of scanning one picture element made by one spot of the Ar+ laser beam being not longer than 5 μs, and detecting said emission with a photodetector.

2. The method of claim 1 wherein said Ar+ laser beam has a spot diameter of between 50 to 300 μm on the phospor.

3. The method of claim 1 wherein said photodetector includes a photo multiplier or a photodiode.

4. The method of claim 1 wherein said Ar+ laser beam is absorbed by a filter mounted in front of the photodetector.

5. The method of claim 1 wherein the laser beam has a wavelength of 514.5 nm.

* * * * *